Jan. 26, 1954     O. SANDBERG     2,667,258
ARTICLE TRANSFER MACHINE
Filed March 25, 1950     6 Sheets-Sheet 1
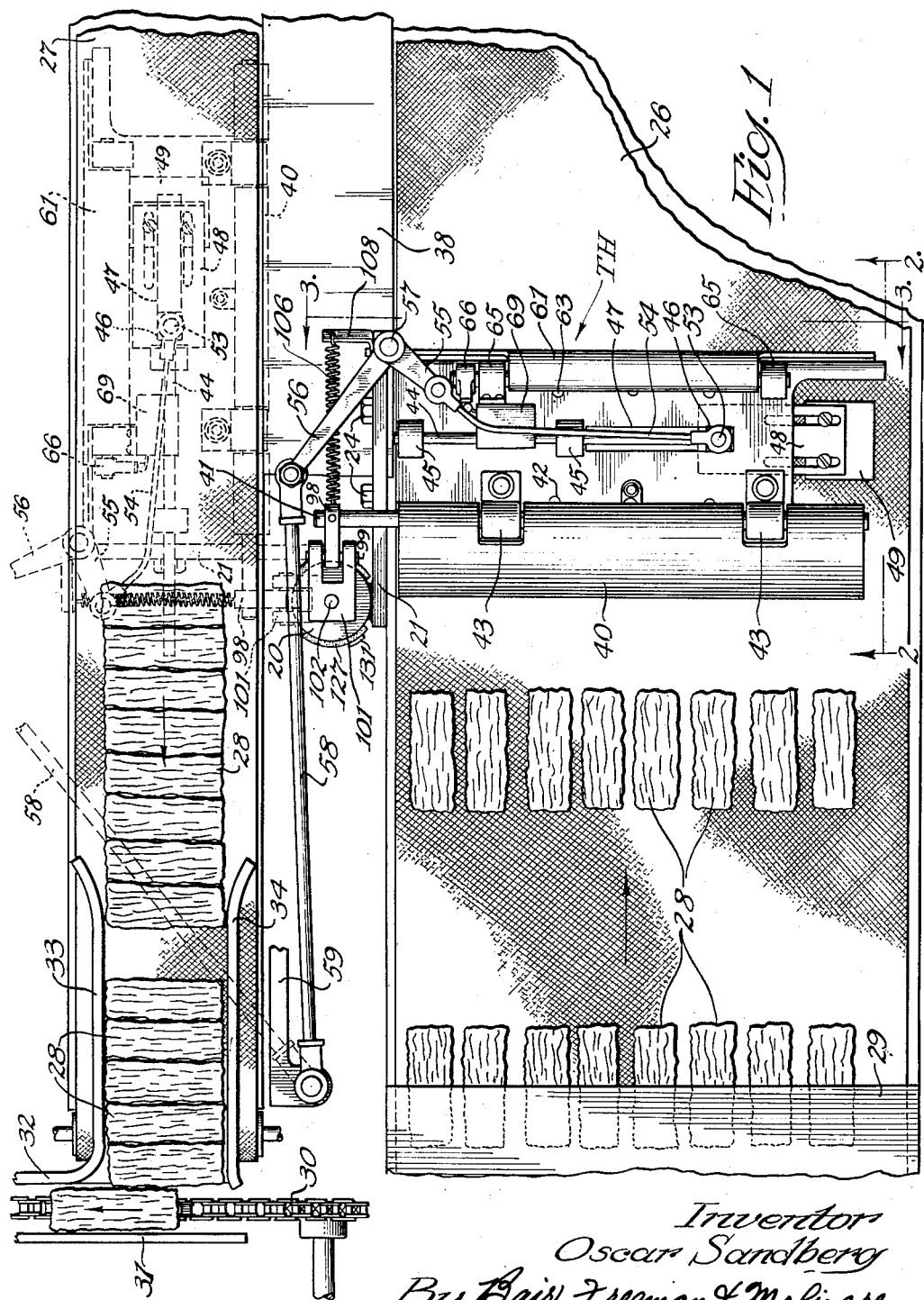
Inventor
Oscar Sandberg
By Bair, Freeman & Molinare
Attys.

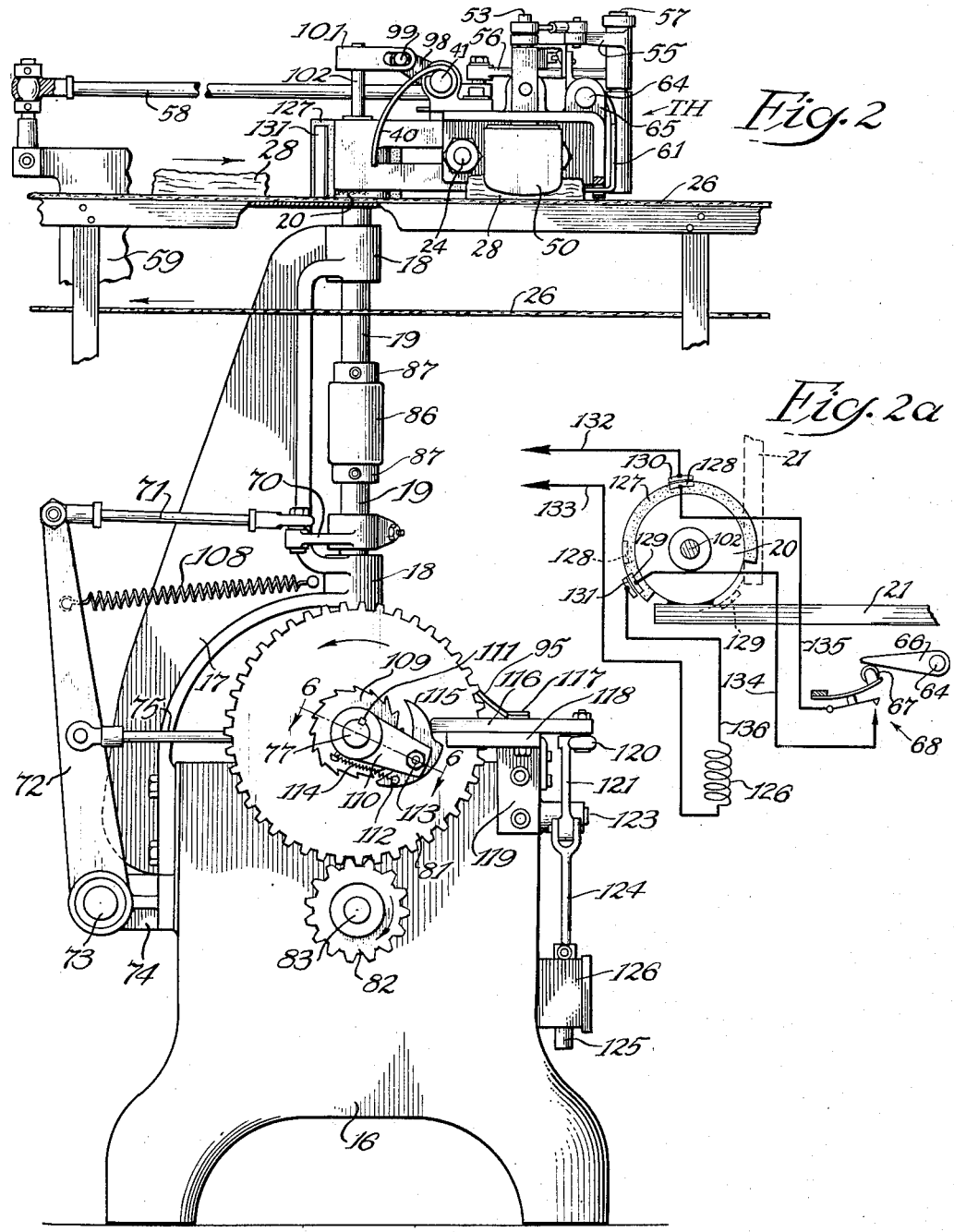

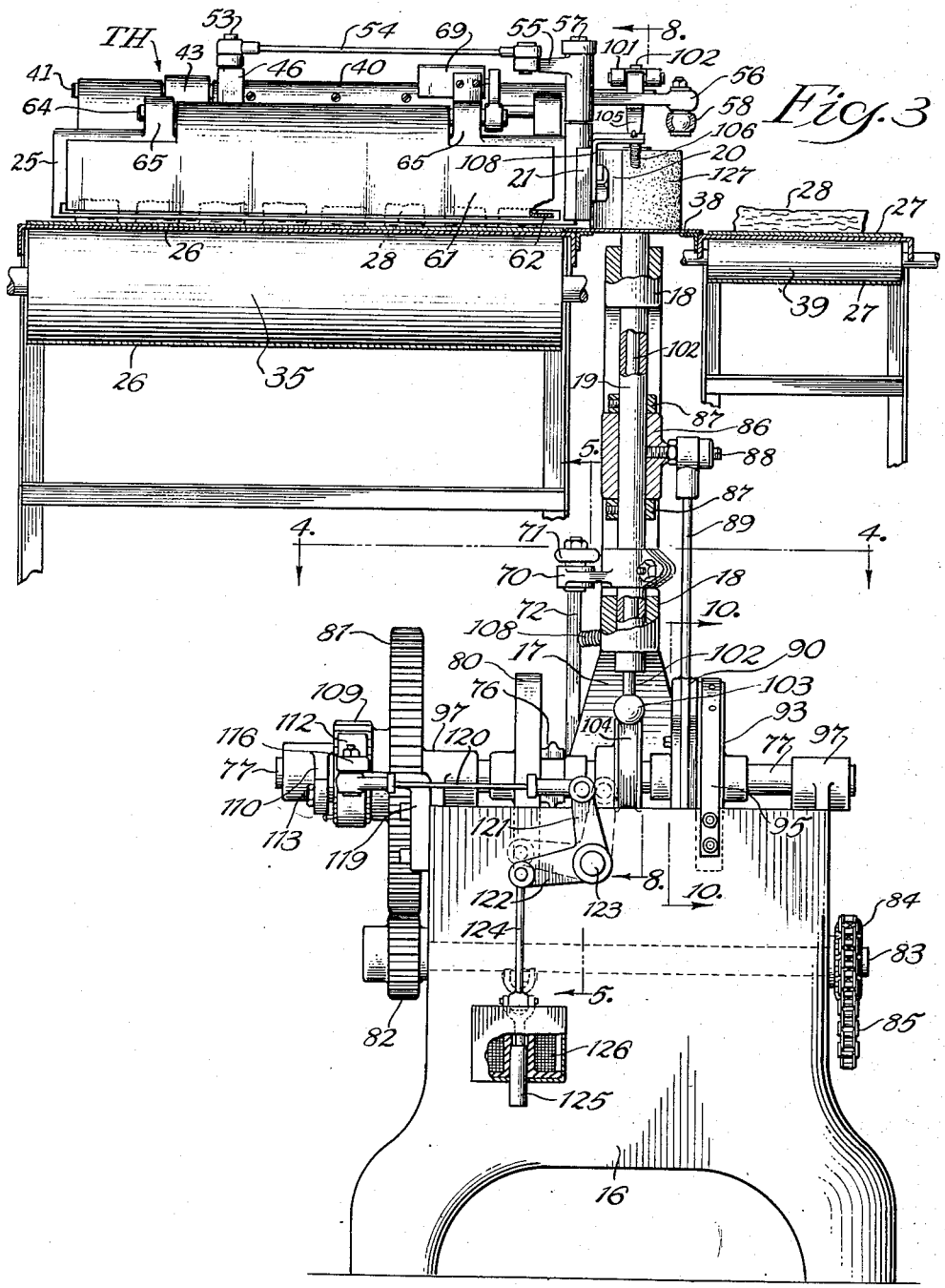

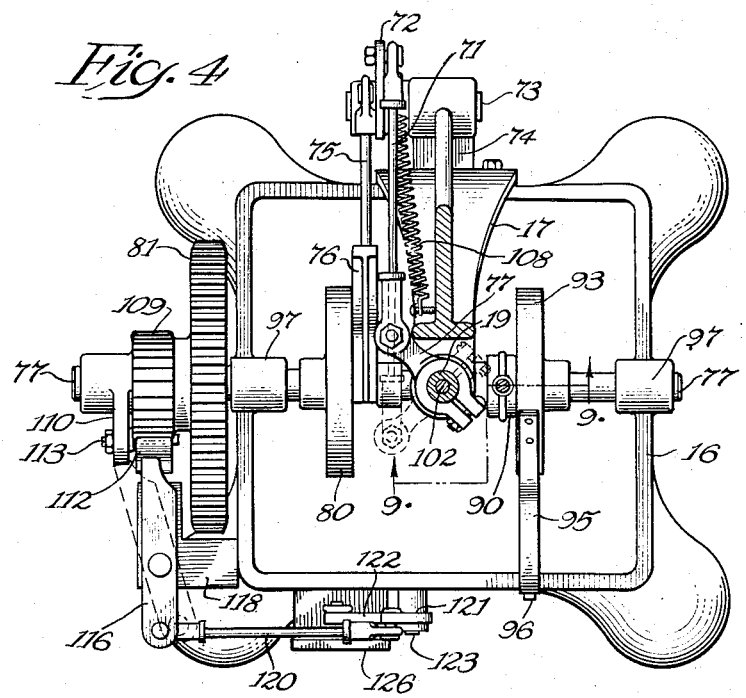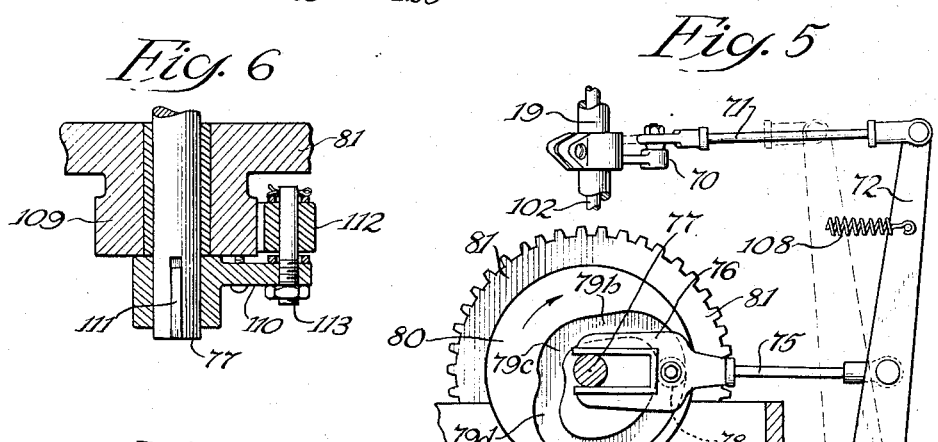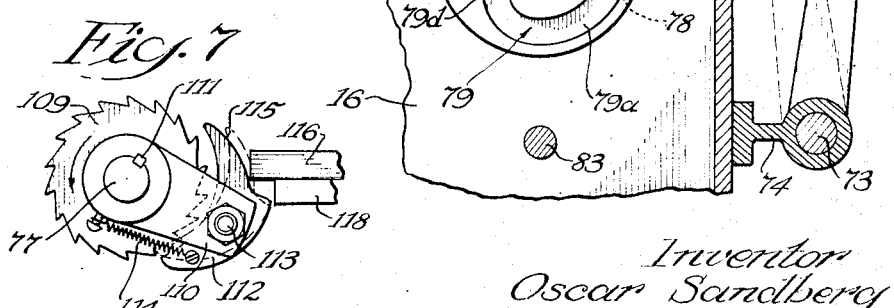

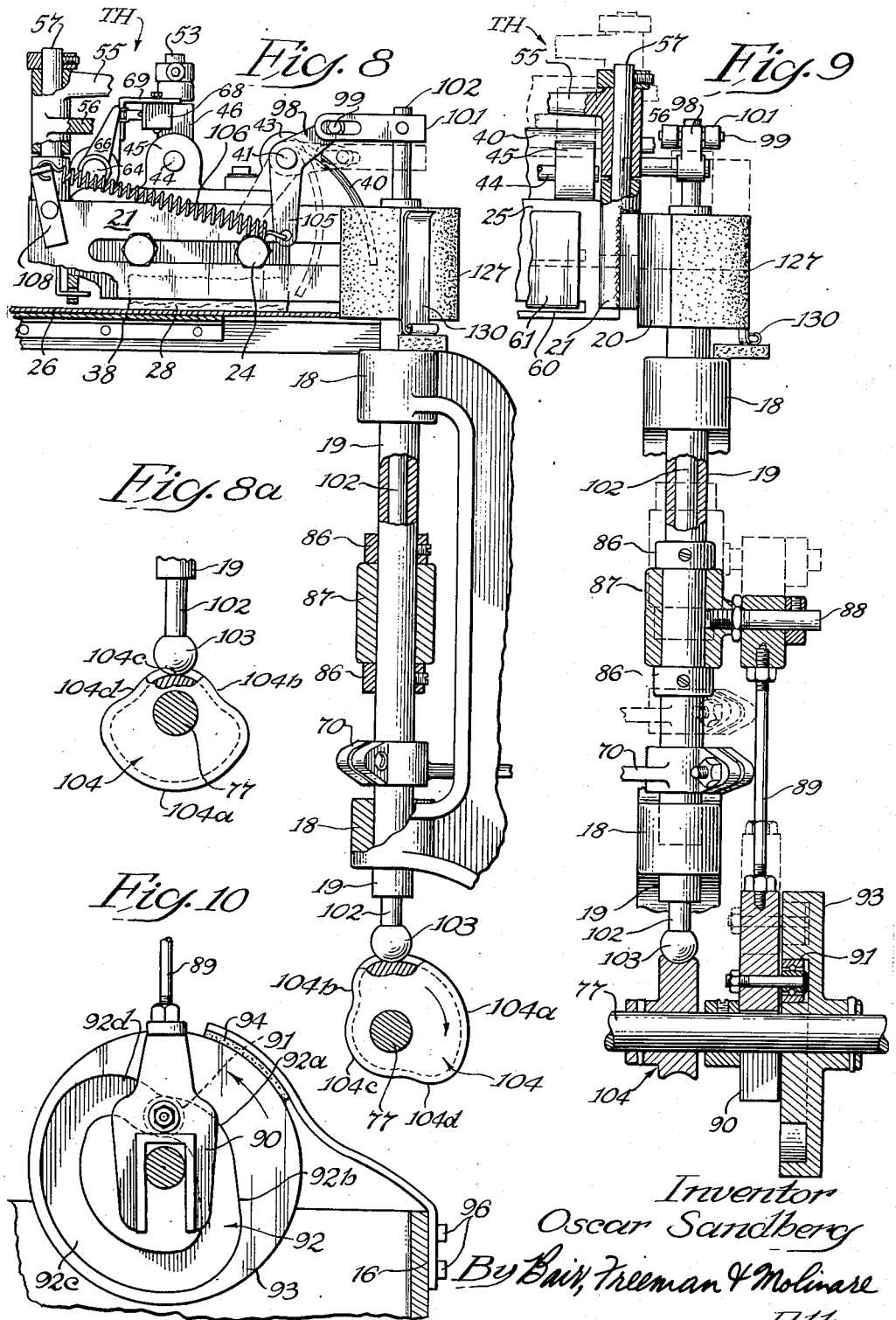

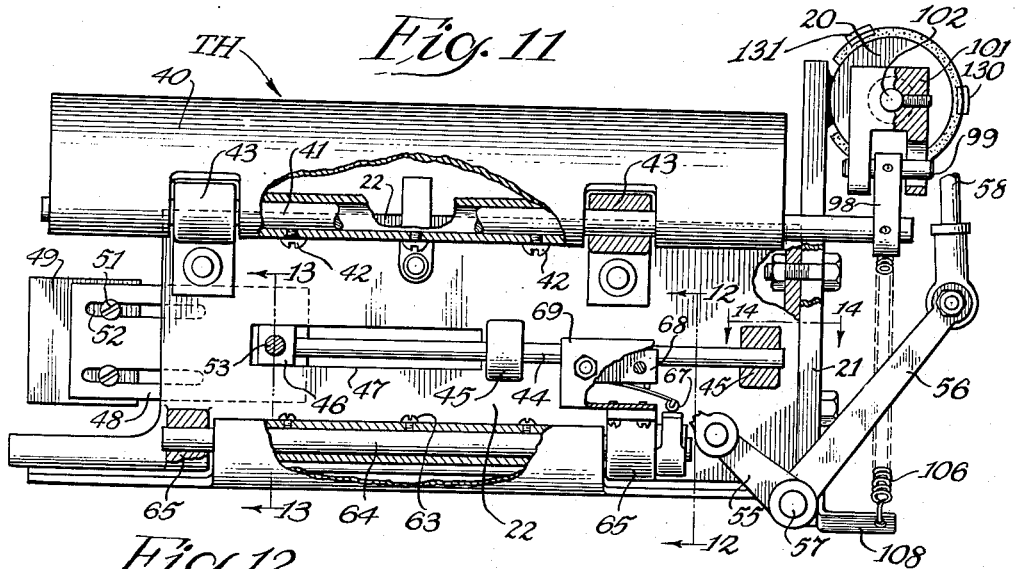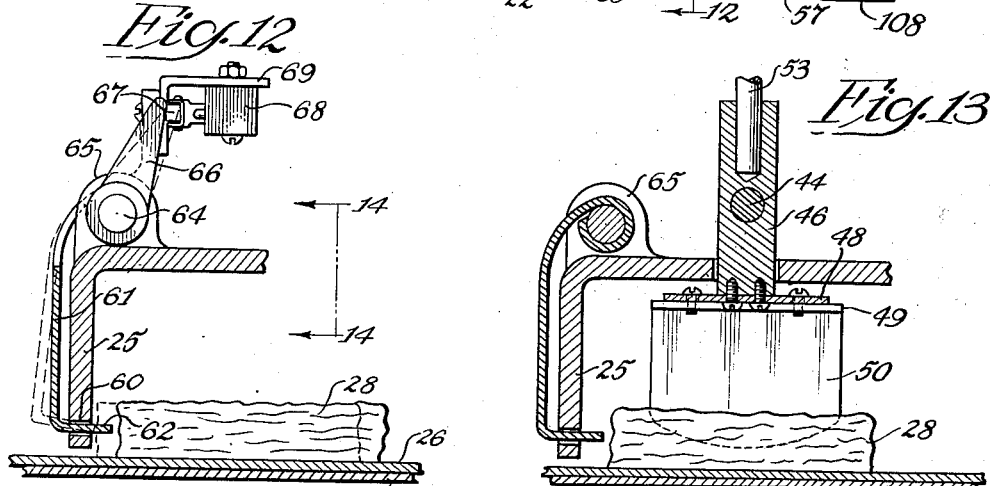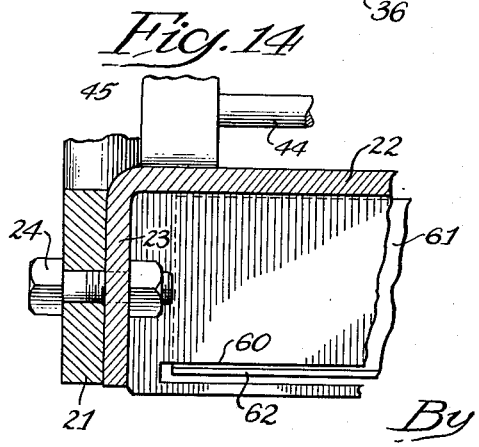

Patented Jan. 26, 1954

2,667,258

UNITED STATES PATENT OFFICE 2,667,258

ARTICLE TRANSFER MACHINE

Oscar Sandberg, Toledo, Ohio, assignor to Lynch Corporation, Anderson, Ind., a corporation of Indiana Application March 25, 1950, Serial No. 151,837

12 Claims. (Cl. 198—21)

This invention relates to an article transfer machine and particularly to one adapted to eliminate the necessity of hand transferring of articles such as candy bars or the like from a forming machine therefor to a feed conveyor of a wrapping machine.

One object of the invention is to provide a transfer machine which can be interposed between an article delivery conveyor and an article feed conveyor of a wrapping machine and which will transfer the articles from the delivery conveyor to the feed conveyor in an automatic and efficient manner.

Another object is to provide a transfer machine for including a transfer head adaptable for receiving a plurality of articles, and mechanism for operating the head so that it transfers the articles from one conveyor belt to another and rearranges them on the second one in a desirable manner for proper conveyance thereby.

A further object is to provide a transfer head which is swingable a quarter turn for transferring candy bars or the like fed endwise on to a delivery conveyor to a feed conveyor on which they are fed sidewise.

Still a further object is to provide a transfer head which is initially open to receive a plurality of articles and then closes in response to such reception and slides them from one belt across a transfer plate on to another belt whereupon the transfer head rises for releasing the bars on the second belt and returns to the initial position where it remains inoperative until another cycle of operation is initiated by additional articles.

An additional object is to provide means during the swinging operation to compact the articles with relation to each other, they being fed to the transfer head in a spaced arrangement, the articles being thereby properly fed by the second conveyor.

With these and other objects in view, my invention consists in the construction, arrangement and combination of the various parts of my article transfer machine, whereby the objects contemplated are attained, as hereinafter more fully set forth, pointed out in my claims and illustrated in the accompanying drawings, wherein:

Figure 1 is a plan view of an article transfer machine embodying my present invention.

Figure 2 is a right side elevation thereof on the indicated line 2—2 of Figure 1.

Figure 2a is an electro-diagram of an automatic clutch control.

Figure 3 is a rear elevation thereof on the indicated line 3—3 of Figure 1.

Figure 4 is a horizontal sectional view taken on the line 4—4 of Figure 3 and shows a plan view of the mechanism for operating a transfer head of the machine.

Figure 5 is a vertical sectional view on the line 5—5 of Figure 3 showing a cam for actuating a swing shaft of the mechanism.

Figure 6 is an enlarged sectional view on the line 6—6 of Figure 2 showing a clutch mechanism.

Figure 7 is a right side elevation of Figure 6 looking upwardly on the drawing at Figure 6.

Figure 8 is an enlarged vertical sectional view on the line 8—8 of Figure 3 to further illustrate the mechanism for operating the transfer head.

Figure 8a is a view of the lower portion of Figure 8 showing the parts in a different position.

Figure 9 is an enlarged vertical sectional view on the line 9—9 of Figure 4 to further detail the operating mechanism for the transfer head.

Figure 10 is an enlarged vertical sectional view on the line 10—10 of Figure 3 to illustrate a cam means for raising and lowering the transfer head.

Figure 11 is an enlarged plan view of a portion of Figure 1 showing the transfer head per se.

Figure 12 is a further enlarged vertical sectional view on the line 12—12 of Figure 11 showing the operation of a control switch in response to engagement by the articles to be transferred.

Figure 13 is a similarly enlarged vertical sectional view on the line 13—13 of Figure 11 to show an article compacting mechanism, and Figure 14 is a similarly enlarged sectional view on the line 14—14 of Figures 11 and 12 to show details of construction.

On the accompanying drawings I have used the reference numeral 16 to indicate a base (best shown in Figures 2, 3 and 4) adaptable for support on a floor surface or the like and carrying the operating mechanism of my transfer machine. An upright 17 is secured thereto for carrying bearings 18 above the frame 16.

A tubular swing shaft 19 is rockably mounted in the bearings 18 and a collar 20 is secured to the upper end thereof. A supporting bar 21 is welded to the collar 20 as best shown in Figure 1 and extends toward the right which will be termed the "rear" of the machine because the articles transferred by the transfer machine then travel forwardly or to the left after such transfer as will hereinafter appear.

A transfer head mounting plate 22 is provided which plate, as shown in Figure 14, is relatively thick to provide an adequate support for the transfer head mechanism and has a depending end flange 23 bolted as at 24 to the supporting bar 21. The supporting plate 22 also has a front flange 25 (see Figure 13).

My article transfer machine is adapted for mounting between a delivery conveyor 26 and a feed conveyor 27 as shown in Figure 1 which conveyors travel in opposite directions, the conveyor 26 toward the right and the conveyor 27 toward the left. These conveyors are in the form of belts adapted to support articles such as candy bars 28. At 29 the outlet of an extrusion machine is illustrated from which eight articles such as candy bars issue at one time in batches so that they are spaced on the belt 26 as illustrated.

In general the transfer head TH is adapted to transfer the bars 28 from the belt 26 to the belt 27, the latter belt feeding them on to a feed chain 30. The chain delivers each article 28 to a wrapping position in a wrapping machine such as one of the kind disclosed in my Patents No. 2,208,776 dated July 23, 1940, and No. 2,283,097 dated May 12, 1942. Guides 31, 32, 33 and 34 are provided for the candy bars 28 to assure that they remain in the proper position during feeding from the belt 27 to the chain 30.

In Figure 3, I show rollers 35 and 39 for the delivery conveyor belt 26 and the feed conveyor belt 23, and supporting plates 36 and 37 for the respective belts. The rollers and plates are suitably journalled and supported as illustrated, and suitable companion rollers are provided for the right hand ends of the belts 26 and 27 in Figure 1 but have not been illustrated because this is obvious construction (also roller 39 for 27).

The transfer head mechanism comprises a propeller plate 40 secured to a rock shaft 41 as by screws 42 (see Figures 2 and 11). The rock shaft 41 is journalled in bearings 43 mounted on the transfer head mounting plate 22.

Article compacting mechanism is provided comprising a slide shaft 44 mounted in bearings 45. The shaft 44 carries a post-like head 46 slidable in a slot 47 of the mounting plate 22, which carries on its lower end under the plate 22 as shown in Figure 13, a plate 48 and an angle-shaped compactor element having a horizontal flange 49 and a vertical flange 50. The flange 49 is secured to the plate 48 by screws 51 through slots 52 of the plate 48, the slot and screw arrangement providing for adjustment.

For sliding the slide shaft 44, the upper end of the head 46 has a stub shaft 53 projecting therefrom on which the lower end of a link 54 in Figure 1 is oscillatably mounted. The upper end of this link is oscillatably mounted on the short arm 55 of a bell crank, the long arm of which is indicated at 56. This bell crank is oscillatable on a vertical stub shaft 57 having its lower end rigidly mounted on the mounting plate 22.

A second link 58 has its right hand end pivotally connected with the bell crank arm 56 and its left hand end pivotally connected to a stationary bracket 59. As shown at the left side of Figure 2, the pivots between 56 and 58 and between 58 and 59 are of ball-type to prevent binding of the parts when the transfer head is raised as will hereinafter be described.

Referring to Figure 12, the front flange 25 of the transfer mounting plate of Figure 14 is provided with a slot 60. An article actuated plate 61 is mounted adjacent the flange 25 and provided with a horizontal flange 62 extending through the slot 60, the plate 61 being secured as by screws 63 to a rock shaft 64 journalled in bearings 65 of the mounting plate 22.

The rock shaft 64 has an arm 66 mounted thereon as shown in Figure 12 adapted to depress a roller 67 of a control switch 68 at times for establishing a circuit through the switch. The switch is mounted on a bracket 69 secured to one of the bearings 65.

For swinging the swing shaft 19, I provide an arm 70 mounted thereon as shown in Figure 2 with which one end of a link 71 is connected, the other end of the link being connected to an arm 72 pivoted at 73 to a bracket 74 mounted on the base 16. A link 75 is pivoted to the arm 72 intermediate its ends and terminates in a fork 76 (see Figure 5) straddling a cam shaft 77 and provided with a roller 78 for travel in a cam groove 79 of a cam 80. A spring 108 takes up lost play in the swing shaft operating mechanism.

The cam shaft 77 is journalled in bearings 97 of the base 16 (see Figure 4) and is provided with a gear 81 meshing with a pinion 82 on a drive shaft 83. The drive shaft is provided with a sprocket 84 with which a chain 85 meshes, the chain extending to a sprocket on a shaft of the wrapping machine so as to be driven in timed relation therewith in a manner which has not been illustrated as it is believed obvious.

For raising the transfer head TH at certain times, I provide a sleeve 86 rotatably and non-slidably mounted on the tubular shaft 19 between seat collars 87 secured to the shaft. A pivot stud 88 extends from the sleeve 86 and the upper end of a link 89 is pivoted thereto. The lower end of the link terminates in a fork 90 as shown in Figure 10 provided with a roller 91 for travel in a cam groove 92 of a cam 93 mounted on the cam shaft 77. A friction shoe 94 is provided for the cam 93 and is carried by a spring arm 95 secured at 96 to the base 16.

I provide a means for swinging the propeller plate 40 (shown in Figures 8, 9 and 11) comprising an arm 98 secured to the rock shaft 41 and carrying a pin 99. This pin is received in slots 100 of an arm 101 secured to a slide rod 102 slidable in the tubular swing shaft 19. The lower end of this rod terminates in a ball head 103 retained in contact with the grooved periphery of a cam 104 secured to the cam shaft 77. The arm 98 has an extension 105 connected by a spring 106 to a bracket 108 on the supporting arm 21 which tends to rock the arm 98 clockwise in Figure 8 thus keeping the ball head 103 in contact with the cam 104.

For rotating the cam shaft 77 periodically and at the proper time in an automatic manner, I provide a clutch comprising a ratchet disc 109 (see Figures 2, 6 and 7) secured to the cam shaft gear 81, the gear and the disc being freely rotatable on the cam shaft. An arm 110 is keyed to the shaft as at 111 and carries a pawl 112 pivoted thereto at 113. This pawl is normally engaged with the teeth of the ratchet disc 109 by a spring 114, the direction of rotation being counter-clockwise. In Figure 2 the pawl is disengaged from the ratchet teeth because of a cam surface 115 on the pawl engaging a stop arm 116. The stop arm is pivoted at 117 to a horizontal flange 118 of a bracket 119, the bracket being secured to the base 16.

A link 120 (see Figures 3 and 4) has its left end pivoted to the stop arm 116 and its right end pivoted to a vertical arm 121 of a bell crank, the other arm of which is illustrated at 122. The bell crank is pivoted at 123 to the base 16 and a link 24 has its upper end pivoted to the arm 122 and depends therefrom. Connected with the lower end of the link 24 is a magnetic core 125 adapted to be elevated by a solenoid 216 whenever the solenoid is energized.

The control switch 68 is provided for automatically energizing the solenoid 126 and the circuit is shown in Figure 2a. The circuit includes a commutator of shoe-and-brush arrangement illustrated diagrammatically in this figure in which an arcuate strip of insulation 127 is secured to the collar 20 and carries a pair of contactor shoes 128 and 129.

Contactor brushes 130 and 131 are mounted on an insulating block 137 which in turn is mounted on the upright 17 of the base 16 and resiliently engage the shoes 128 and 129 for establishing the circuit in the normal position of the transfer head TH shown by full lines in Figure 1. Line wires 132 and 133 are connected with the brush 130 and the solenoid 126 and a solenoid wire 136 extends from the solenoid to the brush 131. The brushes 128 and 129 are connected by switch wires 134 and 135 with the switch 68.

A suitable cover is preferably provided for the commutator just described but has not been illustrated.

Practical operation

In the operation of my article transfer machine, starting with the transfer head TH in the full-line position of Figure 1, it will be noted that a group of articles (for instance eight candy bars) are being extruded from the extruding machine 29 and previous to that time eight candy bars were extruded and are accordingly advanced on the belt 26 which is traveling toward the right. Also there is a group of eight candy bars on the belt 27 and a group of five candy bars at the left end of this belt with a sixth one on the feed chain 30. The illustration in Figure 1 thus represents the wrapping machine in operation and likewise the delivery conveyor 26, the feed conveyor 27, and the extrusion machine 29 all operating. The transfer head TH is at rest, however, with the pawl 112 disengaged because of a cycle of operation of the transfer head having been completed and another cycle not yet initiated.

As the belt 26 carries the eight candy bars 28 under the propeller plate 40 toward the article actuated plate 61 as shown by full lines in Figure 12, the eight candy bars will eventually contact the horizontal flange 62 of the disc plate and then swing it to the dash-line position. This will result in the arm 66 closing the switch 68 for completing a circuit through the solenoid 126. As a result, the stop arm 116 will be swung from the full line position to the dash line position of Figure 4 thus permitting the spring 114 to rotate the pawl 112 clockwise in Figure 2 so that it engages one of the teeth of the ratchet wheel 109. Since the ratchet wheel is constantly rotating, it will rotate the cam shaft 77 by reason of the pawl 112 rotating with the ratchet wheel and carrying with it the arm 110.

Rotation of the cam shaft 77 accomplishes three distinct operations in the transfer head TH. The first one is to close the propeller plate 40 and the second one is to swing the head from the full-line position of Figure 1 to the dotted line position for sliding the eight candy bars off the belt 26 across the transfer plate 38 and on to the belt 27, turning them a quarter turn in the process so that they are aligned in proper relation to the belt 27. In a complete cycle of operation the plate 40 is also raised and the transfer head swung back.

The third operation is to raise the transfer head after it is in the dash-line position of Figure 1 so that the bars 28 can be fed toward the left by the belt 27, the flange 23 of the transfer head mounting plate 22 and the supporting bar 21 being in the way of such movement if the head is left down. Then when the head is swung back to the full-line position of Figure 1, it must again be lowered which is also part of the third operation.

A fourth operation occurs as a result of the swinging (second) operation. The fourth operation is a compacting of the articles, the mechanism for which, during the swinging operation, engages the outermost candy bar being transferred by the transfer head and moves it toward the flange 23 thereby bringing all eight candy bars close together for proper conveyance by the belt 27 which would otherwise have to be operated at too great a speed to take up the spaces between the bars. The belt 27 is in practice operated at a somewhat greater speed than necessary so as to insure proper feed of the bars on to the chain 30, and when one bar is on the chain the remaining bars are held back by that one until it is out of the way, the belt 27 slipping under the bars at that time.

For accomplishing the first operation, that is the swinging of the propeller plate 40, the cam 104 has a high dwell 104a, a drop 104b, a low dwell 104c, and a rise 104d (see Figures 8 and 8a). The cam in Figure 8 is in the normal stopped position corresponding to the arm 110 in Figure 2 as stopped by engagement of the cam surface 115 of the pawl 112 with the stop arm 116. The first increment of movement therefore of the cam shaft 77 causes the ball 103 to traverse the drop 104b to close the propeller plate 40 to the dash-line position of Figure 8 as the transfer head swings. The ball 103 then traverses the low dwell 104c while the transfer head swung is being completed to quarter turn, which quarter turn is accomplished by the roller 78 in Figure 5 traversing the drop 79b of the cam groove 79. The roller 78 is normally in a high dwell 79a of the cam groove and after traversing the drop 79b traverses a low dwell 79c. Next it traverses a rise 79d which swings the transfer head back to the original position after which the roller remains in the high dwell 79a until the beginning of the next cycle.

After the swing of the transfer head from the full-line position of Figure 1 has been started and about the time it reaches the dash line position, the roller 91 (Figure 10) which has been traversing a low dwell 92a of the cam groove 92 begins to coact with a rise 92b thereof for raising the transfer head to the dash line position shown in Figure 9.

During the swing of the transfer head, the left end of the link 58 in Figure 1, being pivoted to a stationary bracket 59, causes clockwise rotation of the bell crank 55—56 relative to the transfer head for drawing the compacting flange 50 toward the vertical flange 23 of the mounting plate 22, thus effecting a take-up of the spaces between the candy bars that occur because of being extruded from spaced extrusion openings of the extruding machine 29. The final position is shown by dash lines in Figure 1 and the candy bars are all close together at that time for conveyance by the belt 27 without spaces between them as illustrated on this belt.

The cams 104, 81 and 93 are timed in relation to each other so that the propeller plate 40 is started to lower as soon as the clutch 109—112 drops into operating position and the propeller plate is completely down before the swing has been completed. Also just before the swing is completed the transfer head starts to elevate after which the propeller plate stays down and the transfer head stays in the swung and raised position for a period of time until about half the revolution of the cam shaft 77 has been completed.

By this time the eight candy bars have been conveyed a short distance by the belt 27 and the propeller plate begins to close and the transfer head to swing back, the head staying up until the swing back has been nearly completed whereupon the transfer heading lowers and remains lowered until the beginning of the cycle again. Thus the transfer head is capable of taking care of the 8 candy bars 28 when they trip the control switch 68 and compacts the bars and swings them around and deposits them on the belt 27 thereafter.

The cycle is then completed before eight more candy bars on the belt 26 reach the transfer head in its original position and the clutch 109—112 throws out in order for the transfer head operating mechanism to wait for these eight more candy bars. They initiate the next cycle and as long as candy bars are deposited on the delivery conveyor 26, the transfer head will operate at the proper time but when the delivery conveyor runs out of candy bars the transfer head automatically ceases to operate.

The construction of the clutch 109—112 is such that once initiated in operation by energization of the solenoid 126, the cycle will be completed even though the solenoid is then de-energized. I provide for de-energizing the solenoid after the initiation of a cycle of operation by the commutator arrangement shown in Figure 2a. After a few degrees rotation of the transfer head from the normal position toward the dash line position of Figure 1, the shoes 128 and 129 leave the brushes 130 and 131 so that current is cut off to the solenoid thus minimizing the time that it is energized.

After the candy bars are deposited on the feed conveyor 27 and the transfer head is raised, the article actuated plate 61 will return to normal position due to gravity thus opening the switch 68 again and conditioning it for the next operation when more candy bars are received in the transfer head. Without the commutator arrangement, the solenoid would remain energized over half the time whereas with it it is energized for only a very small percentage of the time.

From the foregoing specification, it will be obvious that I have provided an article transfer machine which accomplishes the objects contemplated and does so with efficiency and precision. The transfer head operation is automatically initiated depending upon the supply of candy bars thereto by the delivery conveyor 26 and deposits them in a rearranged manner on the feed belt 27 without the necessity of any manual handling from the time the candy bars are extruded from the machine 29. The bars are automatically transferred and wrapped without human hands having touched them. From the sanitation standpoint this is desirable and the transfer machine also eliminates the necessity of hand transfer of the candy bars from the belt 26 and their proper rearrangement on the belt 27 thus effecting labor-saving economies in the packaging of articles.

Some changes may be made in the construction and arrangement of the parts of my article transfer machine without departing from the real spirit and purpose of my invention, and it is my intention to cover by my claims any modified forms of structure or use of mechanical equivalents which may be reasonably included within their scope.

I claim as my invention:

1. In an article transfer machine for transferring a plurality of articles from a delivery conveyor to a feed conveyor traveling side-by-side in opposite directions, a support, a vertical shaft supported thereby between said conveyors, a transfer head mounted on said shaft and normally positioned over said delivery conveyor to receive articles therefrom, a transfer plate spanning the distance between said conveyors, said shaft being oscillatable to swing said transfer head and a plurality of articles with it from said delivery conveyor across said transfer plate and to a position over said feed conveyor for deposit of said articles thereon, a clutch for oscillating said shaft through one cycle of oscillation, solenoid operated control means to initiate operation of said clutch, a switch for energizing said solenoid closed by the reception of articles in said transfer head, contact means associated with said vertical shaft wherein the contacts are engaged only when said transfer head is in normal position, and a circuit for said solenoid through said switch and contact means in series.

2. In an article transfer machine for transferring articles from a delivery conveyor to a feed conveyor, a support, a vertical shaft supported thereby adjacent said conveyors, a transfer head mounted on said shaft and normally positioned over said delivery conveyor to receive articles therefrom, said shaft being oscillatable to swing said transfer head and a plurality of articles with it to a position over said feed conveyor, a clutch for oscillating said shaft through one cycle of oscillation, electrically operated control means to initiate operation of said clutch, and a switch and a commutator to control energization of said electrically operated control means, said switch being closed by the reception of articles in said transfer head and said commutator being closed by said transfer head only when it is positioned over said delivery conveyor.

3. In an article transfer machine for transferring a plurality of articles from a delivery conveyor to a feed conveyor, a support, a vertical shaft supported thereby between said conveyors, a transfer head mounted on said shaft and normally positioned over said delivery conveyor to receive articles therefrom, said shaft being oscillatable to swing said transfer head to a position over said feed conveyor, a propeller plate pivotally carried by said transfer head and normally swung to a position to permit the entry of articles thereto, means for swinging said propeller plate to a position to engage the articles that enter said transfer head while said propeller plate is in normal position and effect sweeping thereof from said delivery conveyor to said feed conveyor upon subsequent movement of said transfer head, a clutch for oscillating said shaft through one cycle of oscillation, and control means operated by the articles carried by said delivery conveyor into said transfer head to initiate operation of said clutch.

4. In a machine for transferring a plurality of articles from a delivery conveyor to a feed conveyor, a support, a vertical oscillatable shaft supported thereby between said conveyors, a transfer head mounted on said shaft and normally positioned over said delivery conveyor to receive articles therefrom, said shaft being operable to swing said transfer head to a position over said feed conveyor, a propeller plate carried by said transfer head and movable relative thereto to one position to permit the entry of articles thereto and to another position for engaging and propelling the articles and effect swinging thereof with said head from said delivery conveyor to said feed conveyor when said shaft is oscillated, a clutch for oscillating said shaft through one cycle of oscillation, and control means operated by the reception of articles in said transfer head to initiate such oscillation.

5. In an article transfer machine for transferring a plurality of articles from a delivery conveyor to a feed conveyor traveling side-by-side in opposite directions, a support, a vertical shaft supported thereby between said conveyors, a transfer head mounted on said shaft and normally positioned over said delivery conveyor to receive articles therefrom, a transfer plate spanning the distance between said conveyors, said shaft being oscillatable to swing said transfer head to a position over said feed conveyor and sweep a plurality of articles from said delivery conveyor across said transfer plate and on to said feed conveyor, a propeller plate carried by said transfer head and swingable upwardly relative thereto to permit articles to enter said head, means for swinging said propeller plate downwardly to engage the articles and thereby move them when said transfer head is subsequently moved by oscillation of said transfer head, a clutch for oscillating said shaft through one cycle of oscillation, and control means operated by the reception of articles in said transfer head to initiate operation of said clutch.

6. An article transfer machine for transferring a row of spaced articles from a delivery conveyor to a feed conveyor traveling side-by-side in opposite directions, a support, a vertical shaft supported thereby between said conveyors, a transfer head mounted on said shaft and normally positioned over said delivery conveyor to receive articles therefrom, a transfer plate spanning the distance between said conveyors, said shaft being oscillatable to swing said transfer head to a position over said feed conveyor, means to engage one end of the row of articles, said means being movable toward the other end of the row to compact the articles in said transfer head with relation to each other after they enter said head, means to raise said transfer head after it has been swung to permit the articles in the transfer head to be fed by said feed conveyor, a clutch for oscillating said shaft through one cycle of oscillation, and control means operated by the reception of articles in said transfer head to initiate operation of said clutch.

7. An article transfer machine comprising a support, a vertical shaft supported thereby, a transfer head mounted on said shaft and normally positioned over a delivery conveyor to receive articles therefrom, said shaft being oscillatable to swing said transfer head to a position over a feed conveyor to deliver said articles thereto, a propeller plate carried by said transfer head and movable relative thereto to normally permit the entry of articles thereto, means for moving said propeller plate to a non-normal position to engage the articles and effect their transfer from said delivery conveyor to said feed conveyor as said transfer head is moved, means to raise said transfer head after it has been swung to a position over said feed conveyor to permit the articles in the transfer head to be released therefrom and fed by said feed conveyor to a wrapping machine, a clutch for oscillating said shaft through one cycle of operation, and control means operated by the reception of articles in said transfer head to initiate said operation.

8. In an article transfer machine for transferring a plurality of articles from a delivery conveyor to a feed conveyor traveling side-by-side in opposite directions, a support, a vertical shaft supported thereby between said conveyors, a transfer head mounted on said shaft and normally positioned over said delivery conveyor to receive articles therefrom, a transfer plate spanning the distance between said conveyors, said shaft being oscillatable to swing said head to a position over said feed conveyor and thereby transfer a plurality of articles with it from said delivery conveyor across the transfer plate and on to said feed conveyor, a propeller plate carried by said head to permit the entry of articles thereto, means for moving said propeller plate relative to said transfer head to engage the articles during said swinging of said transfer head, means for compacting the articles in said head, means to raise said head after it has been swung to a position over said feed conveyor to permit the articles therein to be fed by said conveyor to a wrapping machine, a clutch for oscillating said shaft through one cycle of oscillation, and control means operated by the reception of articles in said head to initiate the operation of said clutch.

9. An article transfer machine of the character disclosed comprising a transfer head for transferring a row of spaced articles from a delivery conveyor to a feed conveyor, means for mounting said transfer head so that it can be swung from a position over the delivery conveyor to a position over the feed conveyor and back again, said transfer head receiving articles from said delivery conveyor and including means to enclose the articles so that they can be swung with the transfer head as it swings, means to engage one end of the row of articles, said means being movable toward the other end of the row for compacting the articles with relation to each other during the swinging operation, and means to raise the transfer head when it assumes a position over said feed conveyor.

10. In an article transfer machine for transferring a row of spaced articles from a delivery conveyor to a feed conveyor, a vertical shaft supported between said conveyors, a transfer head mounted on said shaft and normally positioned over said delivery conveyor to receive articles therefrom, said shaft being oscillatable to swing said transfer head to a position over said feed conveyor, a propeller plate carried by said transfer head and normally in a position relative thereto to permit the entry of articles thereto, means for moving said propeller plate to a position to engage the articles and effect the sweeping thereof from said delivery conveyor to said feed conveyor as said transfer head is moved, means to raise said transfer head after it has been swung to a position over said feed conveyor to permit the articles in the transfer head to be fed thereby to a wrapping machine, means carried by said transfer head to engage one end of the row of articles, said means being movable toward the other end of the row for compacting said articles with respect to each other during the swinging motion of the transfer head whereby the articles are closely side by side when delivered to said feed conveyor, a clutch for oscillating said shaft through one cycle of oscillation, and control means operated by the reception of articles in said transfer head to initiate said operation of said clutch.

11. In an article transfer machine, a vertical shaft supported for oscillation and vertical reciprocation, a transfer head mounted on said shaft and normally positioned over a delivery conveyor to receive articles therefrom, said shaft being swingable for moving said transfer head to a position over said feed conveyor, a propeller plate carried by said transfer head to permit the entry of a row of spaced articles thereto, means for moving said propeller plate relative to said head to position it to engage the articles and effect the sweeping thereof from said delivery conveyor to said feed conveyor when said head is swung by oscillation of said vertical shaft, means to elevate said vertical shaft and thereby said transfer head after it has been swung to a position over said feed conveyor to permit the articles in the transfer head to be fed by said feed conveyor to a wrapping machine, means carried by said transfer head to engage one end of the row of articles, said means being movable toward the other end of the row for compacting said articles with respect to each other during the swinging motion of the transfer head, a clutch for oscillating and reciprocating said shaft through a single cycle of operation, and control means operated by the reception of articles in said transfer head to initiate such operation.

12. A machine for transferring articles from a delivery conveyor to a feed conveyor comprising a vertical shaft supported between said conveyors, a transfer head mounted on said shaft and normally positioned over said delivery conveyor to receive articles therefrom, said shaft being oscillatable to swing said transfer head to a position over said feed conveyor to transfer a plurality of articles from the delivery conveyor to the feed conveyor, means to raise said transfer head after it has been swung to a position over said feed conveyor to permit the articles in the transfer head to be fed thereby to a wrapping machine, means carried by said transfer head to engage one end of the row of articles, said means being movable toward the other end of the row for compacting said articles with respect to each other during the swinging motion of the transfer head whereby the articles are closely side by side when delivered to said feed conveyor, a clutch for oscillating said shaft and raising said transfer head through one cycle of operation, and control means operated by the reception of articles in said transfer head to initiate said operation.

OSCAR SANDBERG.

References Cited in the file of this patent

UNITED STATES PATENTS

| Number | Name | Date |
|---|---|---|
| 1,833,951 | Morton et al. | Dec. 1, 1931 |
| 1,889,846 | Wright | Dec. 6, 1932 |
| 1,979,878 | Harding | Nov. 6, 1934 |
| 1,990,745 | Moore et al. | Feb. 12, 1935 |
| 2,090,129 | Kimball et al. | Aug. 17, 1937 |
| 2,470,795 | Socke | May 24, 1949 |